Aug. 31, 1926.

O. H. HESSE 1,598,079

LAND VEHICLE

Filed July 16, 1923

INVENTOR
*Otto H. Hesse.*
BY
*Albert E Dietrich*
ATTORNEY

Aug. 31, 1926.

O. H. HESSE 1,598,079

LAND VEHICLE

Filed July 16, 1923   2 Sheets-Sheet 2

INVENTOR
*Otto H. Hesse.*
BY
ATTORNEY

Patented Aug. 31, 1926.

1,598,079

UNITED STATES PATENT OFFICE.

OTTO H. HESSE, OF LEAVENWORTH, KANSAS.

LAND VEHICLE.

Application filed July 16, 1923. Serial No. 651,928.

The present invention has for its object to provide an improved construction of semi-trailer; to provide such a construction of vehicle chassis that it may receive an end dump body of the rocker type and so locate the load that a portion of its weight will be brought to bear over the rear axle of the tractor when the trailer is connected thereto; to provide a vehicle of such construction that the pulling force exerted by the tractor is applied in a direct line to the rear axle of the semi-trailer instead of through the chassis frame of the vehicle.

In its general nature the invention comprises a semi-trailer having a chassis frame of substantially rectangular form in plan to which is secured a tongue-like beam which projects beyond the front of the frame and is forked to straddle the guide bolt of the tractor saddle, a standard projecting down from the tongue beam and being secured thereto and to the front of the frame; the draft connection with the tractor is made to the lower end of the standard and the pull is transmitted therefrom through radius rods directly to the rear axle of the vehicle, the rear axle and frame being connected by springs of the quarter cantilever type which are secured to the frame and project rearwardly therefrom and having a sliding connection with the axle of the vehicle.

With other objects in view that will be apparent to those skilled in the art the invention also embodies those novel details of construction, combination and arrangement of parts, all of which will be first fully described, then specifically pointed out in the appended claims, and illustrated in the accompanying drawings in which:

Figure 3 is a rear perspective of the invention, the foot for supporting the front end of the vehicle when disconnected from the tractor being down.

Figure 4 is a detail vertical longitudinal section illustrating the manner of loop connecting the spring ends.

Figure 1:
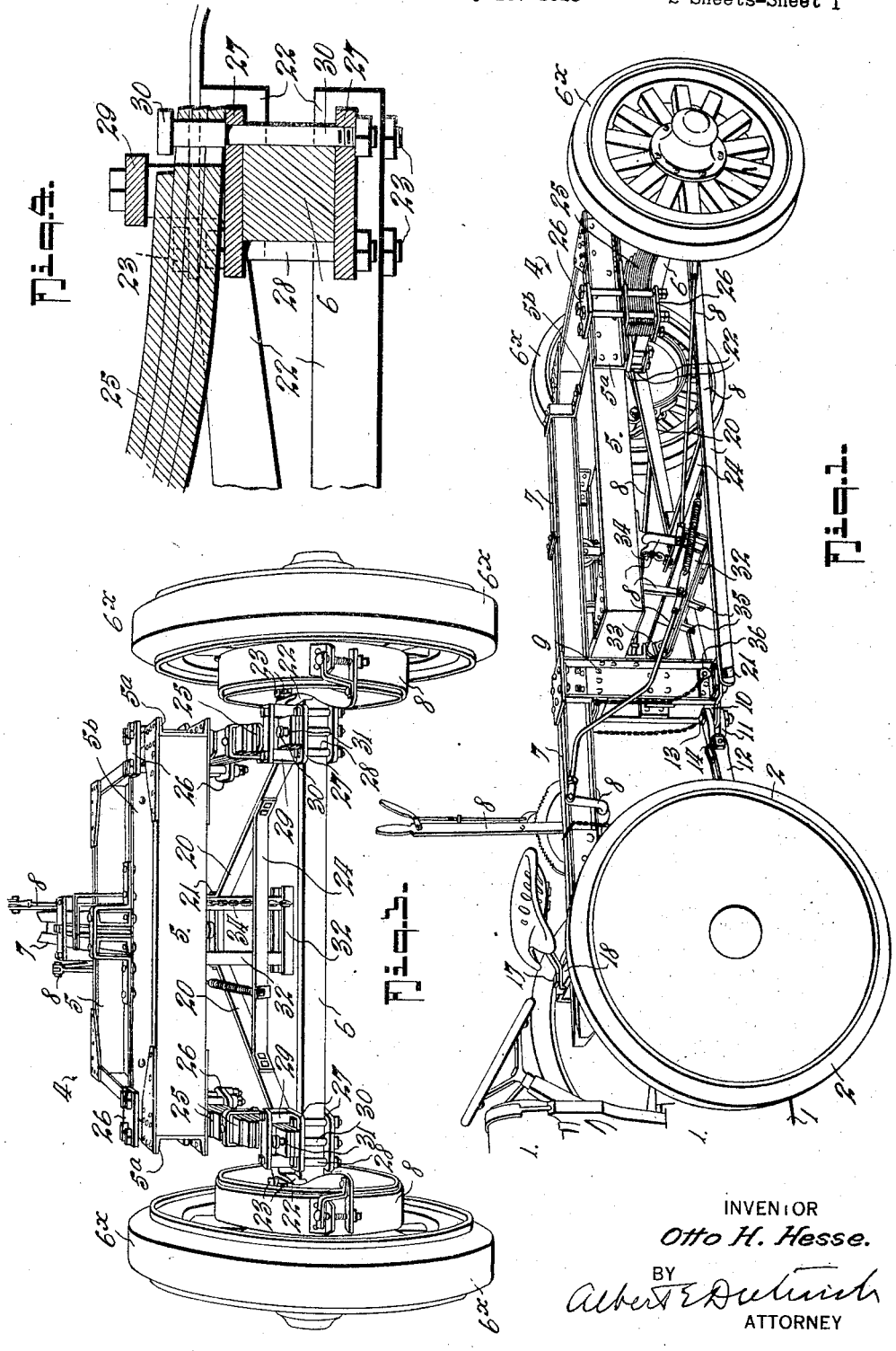
Figure 1 is a perspective view of my invention attached to a tractor.
Figure 2:
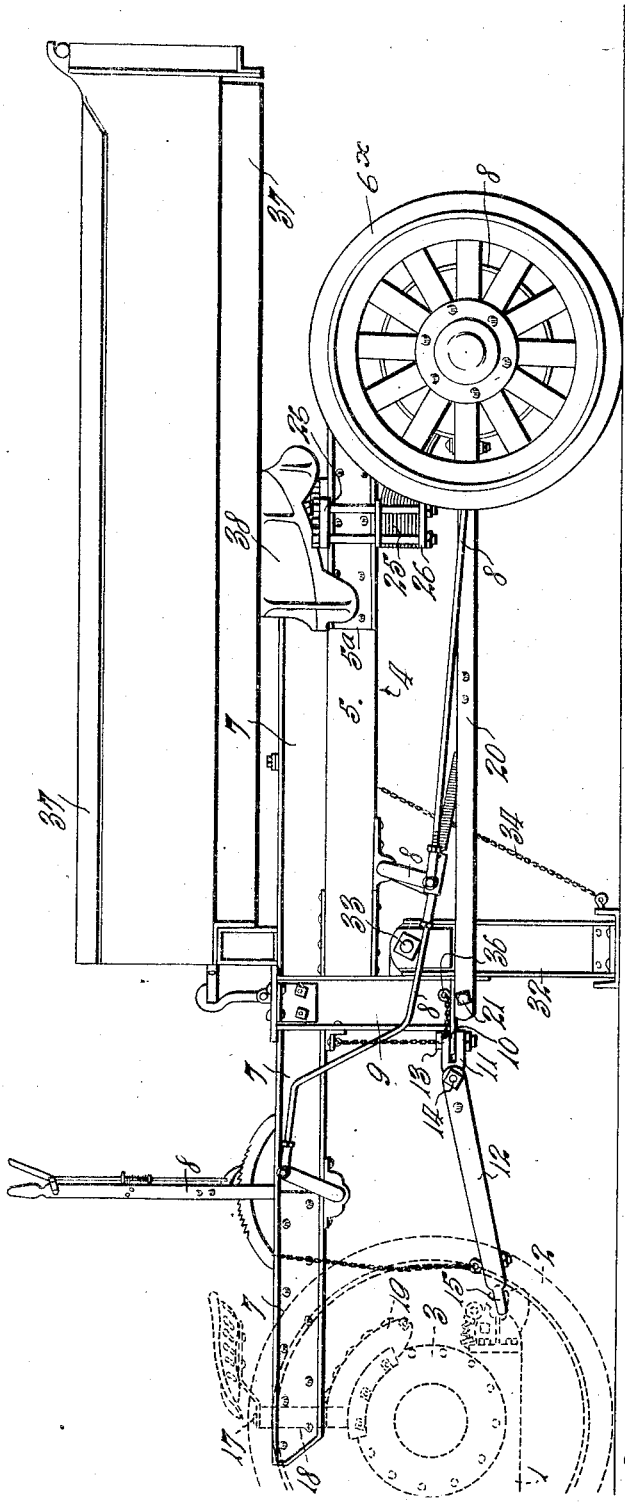
Figure 2 is a side elevation of the invention with a rocker type dump body being in place thereon, a portion of the tractor being indicated in dotted lines.

In the drawings, in which like numerals and letters of reference indicate like parts in all the figures, 1 is the tractor, which is of the usual construction (a Fordson type tractor being illustrated) and which includes the driving wheels 2 and rear axle housing 3.

4 is the semi-trailer whose frame 5 is composed of channel irons suitably reinforced at $5^a$ and $5^b$ and supported over the rear axle 6 on which the wheels $6^x$ are mounted in any desired way. The chassis frame 5 of the semi-trailer is connected with the rear axle 6 through the medium of quarter cantilever spring packs 25 which are secured at 26 to the reinforced portion of the chassis frame and have their lower ends guided in yokes 29 on the upper axle clamp plate 27 to which they are secured loosely by bolts 30 passing through elongated holes 31 in the spring leaves, the upper and lower clamp plates 27 being connected together by clamp bolts 28.

7 designates the tongue beam which is rigidly secured to the frame 5 and is bifurcated at its front end to straddle the guide bolt 17 and rest on the tractor saddle 19, the tongue 7 passing through the yoke 18 of the tractor saddle.

A suitable brake mechanism 8 is provided for controlling the movement of the wheels $6^x$ of the semi-trailer.

9 designates a standard which is rigidly secured to the tongue 7 and to the front end of the chassis frame 5. The lower end of the standard 9 is provided with a shackle plate 10 to which the member 11 of the draft appliance 12 is pivoted at 13, the members 11 and 12 being pivoted together at 14 on a horizontal axis, while the pivot 13 is on a vertical axis. Thus the bar 12 is connected to the standard 9 by a universal joint. The draft bar 12 has an eye or loop 15 at its front end by which it may be coupled to the tractor pintle hook so as to have a flexible (preferably lateraly and vertically movable) connection with the tractor.

The general construction of the tongue 7, standard 9, and parts 10 to 19 inclusive, may be such as is heretofore known in the art. In the present instance, however, I provide radius rods 20 which are pivoted at 21 to the lower end of the standard 9 and which are connected by collars 22 to the rear axle 6 adjacent to the wheels $6^x$, the radius rods 20 being cross braced at 24, as best shown in Figure 1. The collars 22 may be of the split type and be secured by bolts 23.

32 is a foot which is hinged at 33 to the standard 9 and is adapted to be held elevated by a suitable chain device 34 when not in use and is adapted to be held down when in use by apertured projections 35 which are secured to the lower end of the standard 9 by removable pins 36 so that the foot 32 and standard 9 will support the front end of the vehicle when disconnected from the tractor.

37 is the dump body which may be of any approved construction and which is mounted on rockers 38 that are in turn mounted on the chassis frame 5 in such position as to locate the center of gravity of the body 37 in advance of the rear axle 6, thereby causing a portion of the weight of the load to be impressed on the saddle 19 of the tractor. As the construction of the dump body and rockers are per se no part of my invention, detailed disclosure of the construction thereof is thought to be unnecessary.

The manner of coupling and uncoupling the trailer with the tractor in this embodiment of my invention will be readily apparent to those skilled in the art.

From the foregoing it will be noted that my present construction of cantilever spring arrangement permits the termination of the chassis frame at the rear end to be ahead of the axle instead of behind the axle as would be the case were the ordinary type of semi-elliptic springs employed. The quarter cantilever spring construction employed in my invention is a very desirable feature because it permits the rocker 38 or pivotal point of the dump body to be placed well ahead of the axle, thereby distributing a desired portion of the live load on the rear axle of the tractor to give added traction to the driving wheels. If the conventional type of semi-elliptic springs were used it would necessitate the rear member of the frame to be behind the axle, the distance depending upon half the length of the springs. This would make it necessary in some cases to mount the dump body sufficiently far back on the frame to allow the body to properly clear the rear cross member of the frame when in a dumping position which would in turn cause the body to be mounted on the frame at a point that would impart very little or no portion of the live load to the rear axle and wheels of the tractor.

Again by my construction I am enabled to provide a short coupled, compact unit. Such a unit is especially advantageous and desirable for contractors and all other users of dump body equipment in getting around and in and out of the difficult places that they are often called upon to negotiate.

Again it will be noted that the pull on this trailer, is direct from the bottom of the standard, through the radius rods, to the collars of the axle, and not through the standard, the frame, and the springs to the axle. By slotting the ends of the springs and securing them by loose bolts which pass through the elongated holes, the springs may be loosely connected with the axle so as to slide back and forth when depressed under load, the duty of the bolts being merely to guide the springs and assist in retaining them in their proper positions.

From the foregoing description, taken in connection with the accompanying drawing, it is thought the complete construction, operation and advantages of my invention will be clear to those skilled in the art.

What I claim is:

1. In semi-trailers, a chassis frame, a tongue beam secured thereto and projecting forwardly therefrom, quarter cantilever type springs secured to said frame and projected rearwardly thereunder, a rear wheeled axle on which said springs are mounted, a standard depending from said frame, a draft appliance connected to said standard and itself adapted to be connected to the pintle hook of a tractor, and radius rods connecting said standard with said rear axle.

2. In semi-trailers, a chassis frame, a tongue beam secured thereto and projecting forwardly therefrom, quarter cantilever type springs secured to said frame and projected rearwardly thereunder, a rear wheeled axle on which said springs are mounted, a standard depending from said frame, a draft appliance connected to said standard and itself adapted to be connected to the pintle hook of a tractor, and radius rods connecting said standard with said rear axle adjacent the place of connection of said draft appliance.

3. In semi-trailers, a chassis frame, quarter cantilever type springs secured to said frame and projecting rearwardly therefrom, a wheeled axle, sliding connections between said springs and axle, a standard at the front of said frame, radius rods connecting said standard with said rear axle, a draft appliance connected to said standard and itself adapted to be connected to a tractor, and means whereby a portion of the live load of the semi-trailer may be impressed on the rear wheels of the tractor with which it may be connected.

4. In semi-trailers, a chassis frame, a tongue beam projecting forwardly therefrom, quarter cantilever type springs secured to said frame and projected rearwardly thereunder, a rear wheeled axle, means slidably mounting said springs on said axle, a standard depending from said frame, a draft appliance connected to said standard and itself adapted to be connected to the pintle hook of a tractor, and radius rods connecting said standard with said rear axle.

OTTO H. HESSE.